United States Patent
Mohanty

(10) Patent No.: US 7,894,449 B2
(45) Date of Patent: Feb. 22, 2011

(54) METHOD AND APPARATUS FOR ENCODING SUBSCRIBER STATION IDENTIFICATIONS AND CONNECTIONS IN WIRELESS COMMUNICATION NETWORKS

(75) Inventor: Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 11/866,482

(22) Filed: Oct. 3, 2007

(65) Prior Publication Data

US 2009/0092071 A1 Apr. 9, 2009

(51) Int. Cl.
*H04L 12/28* (2006.01)
*H04L 12/56* (2006.01)
*H04W 4/00* (2009.01)
(52) U.S. Cl. ............... 370/395.3; 370/328; 370/392
(58) Field of Classification Search ............ 370/310, 370/328, 338, 389, 392, 395.3
See application file for complete search history.

(56) References Cited

U.S. PATENT DOCUMENTS

| | | | | |
|---|---|---|---|---|
| 6,801,508 B1* | 10/2004 | Lim | | 370/310.1 |
| 2004/0100921 A1* | 5/2004 | Khan | | 370/321 |
| 2004/0258026 A1* | 12/2004 | Lau | | 370/335 |
| 2005/0107036 A1* | 5/2005 | Song et al. | | 455/23 |
| 2006/0092911 A1* | 5/2006 | Hwang et al. | | 370/349 |
| 2006/0133403 A1* | 6/2006 | Chun et al. | | 370/431 |
| 2006/0176882 A1* | 8/2006 | Schein et al. | | 370/395.32 |
| 2007/0072604 A1* | 3/2007 | Wang | | 455/428 |
| 2007/0149198 A1* | 6/2007 | Park et al. | | 455/436 |
| 2007/0153685 A1* | 7/2007 | Moon et al. | | 370/229 |
| 2008/0039110 A1* | 2/2008 | Kim et al. | | 455/452.1 |
| 2008/0102865 A1* | 5/2008 | Mohanty et al. | | 455/466 |
| 2008/0170529 A1* | 7/2008 | Connors et al. | | 370/312 |
| 2009/0175213 A1* | 7/2009 | Gu et al. | | 370/312 |
| 2010/0061336 A1* | 3/2010 | Kim et al. | | 370/331 |
| 2010/0177693 A1* | 7/2010 | Ryu et al. | | 370/328 |

* cited by examiner

*Primary Examiner*—Warner Wong
(74) *Attorney, Agent, or Firm*—Cool Patent, P.C.; Joseph P. Curtin

(57) ABSTRACT

A method and apparatus for encoding an identification of a subscriber station and its connections in a data frame for transmission in a wireless communication network comprising at least one base station and at least one subscriber station is disclosed. The method comprises specifying a subscriber station identification in the data frame to identify the one or more subscriber stations for which contents of the data frame are destined and specifying a connection identification in the data frame to identify one or more connections of the one or more identified subscriber stations to which the contents of the data frame belong. The subscriber station identification and the connection identification can be specified in a single stage or in two stages.

21 Claims, 5 Drawing Sheets

| DL/UL Channel | Scenario | | DL/UL-MAP-IEs | | | GMH | | |
|---|---|---|---|---|---|---|---|---|
| | | | IEEE 802.16d/e standards | Proposed invention | % overhead savings | IEEE 802.16d/e standards | Proposed invention | % overhead savings |
| DL | INC_SS_ID = 0 or INC_CID = 0 | | 0 | 0 | 0 | 16 | 16 | 0 |
| | INC_SS_ID = 0 or INC_CID = 1 | | 16 | B2 ~ 10 | 12.5 | 16 | B3 ~ 4 | 25 |
| UL | SS-specific allocations | | 16 | B2 ~ 10 | 12.5 | 16 | B3 ~ 4 | 25 |
| | Connection-specific allocations | Method 1 | 16 | 16 | 0 | 16 | 0 | 100 |
| | | Method 2 | 16 | 16 | 0 | 16 | B3 ~ 4 | 25 |

| DL/UL Channel | Scenario | | DL/UL-MAP-IEs | | | GMH | | |
|---|---|---|---|---|---|---|---|---|
| | | | IEEE 802.16d/e standards | Proposed invention | % overhead savings | IEEE 802.16d/e standards | Proposed invention | % overhead savings |
| DL | INC_SS_ID = 0 or INC_CID = 0 | | 0 | 0 | 0 | 16 | 16 | 0 |
| | INC_SS_ID = 0 or INC_CID = 1 | | 16 | B2 ~ 10 | 12.5 | 16 | B3 ~ 4 | 25 |
| UL | SS-specific allocations | | 16 | B2 ~ 10 | 12.5 | 16 | B3 ~ 4 | 25 |
| | Connection-specific allocations | Method 1 | 16 | 16 | 0 | 16 | 0 | 100 |
| | | Method 2 | 16 | 16 | 0 | 16 | B3 ~ 4 | 25 |

METHOD AND APPARATUS FOR ENCODING SUBSCRIBER STATION IDENTIFICATIONS AND CONNECTIONS IN WIRELESS COMMUNICATION NETWORKS

FIELD OF THE INVENTION

Embodiments of the present invention relate generally to methods and apparatus for encoding subscriber station identifications and their connections in wireless communication networks.

BACKGROUND OF THE INVENTION

In wireless communication networks, one or more subscriber stations (SSs) receive traffic from a base station (BS) in a downlink (DL) channel and transmit traffic to the BS in an uplink (UL) channel. The DL channel is a broadcast channel because transmissions by the BS can be received by all of the SSs that are in a coverage region of the BS. However, different parts of the DL transmission may be destined for different SSs. Therefore, the BS may inform the SSs about their allocations in a DL frame before it transmits the traffic destined for specific SSs in the DL channel. Hence, different SSs learn about the locations of their traffic, if any, using the allocation information in the DL frame and process only the portions of the DL channel that contain their traffic.

The Institute of Electrical and Electronics Engineers (IEEE) standards, such as 802.16d and 802.16e, specify different methodologies for a BS to inform the SSs about the allocations in the DL frame, which are valid for both time division duplex (TDD) and frequency division duplex (FDD) systems and derivatives thereof, such as half-duplex FDD (HFDD) systems. The BS specifies the allocations in one or more information elements (IEs) of a downlink map (DL-MAP), which contain information about a particular portion of the DL channel, known as a DL burst. A SS decodes the DL-MAP to learn about the DL bursts that contain, or may contain, its traffic. A DL burst that contains traffic for a SS corresponds to the scenario in which the DL-MAP-IE contains an identification of connections for Media Access Control Protocol Data Units (MAC PDUs) that are present in a particular DL burst. A DL burst that may contain traffic for a SS corresponds to the DL-MAP-IE not containing the identification of the connections for the MAC PDUs present in a particular DL burst.

In the 802.16d/e standards, the connections are identified using Connection Identifiers (CIDs). A SS may have multiple CIDs for its different connections. Where the DL-MAP-IE does not contain the CIDs for the MAC PDUs present in DL burst, a SS may choose to process that burst to search for its MAC PDUs. The SS searches for its MAC PDUs using the header of the MAC PDUs that contain the information about the desired receiver(s) of the MAC PDUs. In the 802.16d/e standards, the intended recipient of a MAC PDU is specified by the CID field of the MAC PDU header.

In the 802.16d/e standards, the BS informs the SSs about the allocations for the UL channel using an UL MAP containing UL-MAP-IEs that specify the allocations for different UL bursts. The UL-MAP-IEs inform different SSs about their allocations in the UL channel, which are used by the SSs to transmit their MAC PDUs to the BS.

Each MAC PDU can belong to a unicast, multicast or broadcast connection. The CID field identifies the intended receiver or the group of intended receivers for unicast and multicast connections respectively. A broadcast PDU is intended for all the receivers indicated by the broadcast CID present in the header of the MAC PDU.

The CIDs of the MAC-PDUs contained in a particular DL burst may or may not be specified in a DL-MAP-IE. This is indicated by the INC_CID field in the DL-MAP-IE. When INC_CID=0, CIDs of the MAC PDUs in a DL burst are not specified in the corresponding DL-MAP-IE. When INC_CID=1, the CIDs of the MAC PDUs are specified in the corresponding DL-MAP-IE.

When INC_CID=0, it is not clear to a SS if its MAC PDUs are present in the corresponding DL burst. Therefore, the SS may process the contents of the corresponding DL burst to learn the presence or absence of its PDUs. Thus, when INC_CID=0, the SS has to process the entire DL burst even if there are no PDUs destined for it in the burst. This results in significant power consumption by the SSs, that may be wasted if there are no PDUs for it in the burst.

When INC_CID=1, a SS learns of the presence or absence of its MAC PDUs in the corresponding DL burst from the CIDs specified in the DL-MAP-IE. If a SS finds one or more of its CIDs present in a DL-MAP-IE, it learns that its MAC PDUs are present in the corresponding DL burst. Otherwise, the SS learns of the absence of its MAC PDUs in the DL burst. Therefore, when INC_CID=1 the SS processes the DL burst only if the corresponding DL-MAP-IE contains its CIDs.

Similarly, in the UL, CIDs are used in the UL-MAP-IEs to indicate the allocations of the UL bursts. Moreover, CIDs are used in the header of the MAC PDUs to indicate the connection to which the MAC PDU belongs.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein:

FIG. 6 summarizes the overhead savings achieved with some embodiments of the present invention.

Figure 1:
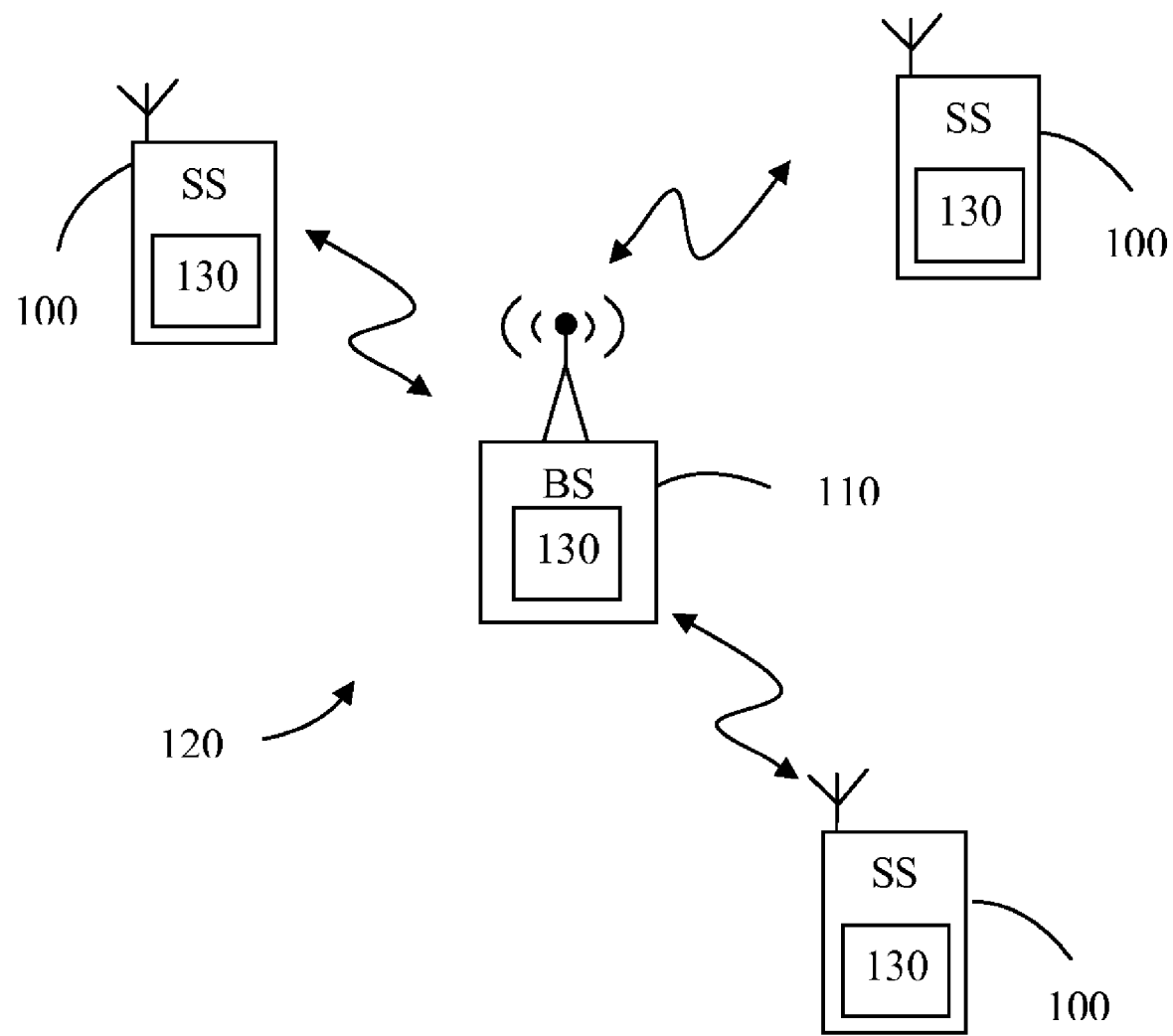
FIG. 1 is a schematic diagram illustrating wireless communication devices communicating in a wireless communication network.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to encoding subscriber station identifications and their connections in wireless communication networks. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of encoding subscriber station identifications and their connections in wireless communication networks as herein described. The non-processor circuits may include, but are not limited to, a radio receiver, a radio transmitter, signal drivers, clock circuits, power source circuits, and user input devices. As such, these functions may be interpreted as a method for encoding subscriber station identifications and their connections in wireless communication networks. Alternatively, some or all functions could be implemented by a state machine that has no stored program instructions, or in one or more application specific integrated circuits (ASICs), Field-Programmable Gate Arrays (FPGAs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

With reference to FIG. 1, a schematic diagram illustrates subscriber stations (SS) 100 communicating with a base station (BS) 110 in a wireless communication network 120. The subscriber stations 100 are in the form of wireless communication devices, such as, but not limited to, mobile telephones, notebook or laptop computers, personal digital assistants (PDAs), portable multimedia devices, mobile internet devices (MIDs), ultra mobile PCs (UMPCs), ultra mobile devices (UMDs) and other wireless communication devices. Embodiments of the present invention can be implemented in, and are applicable to, the subscriber stations 100 and base stations 110, which comprise computer-readable program code components 130 configured to cause encoding of subscriber station identifications and their connections in wireless communication networks and which will be discussed in further detail hereinafter.

Figure 2:
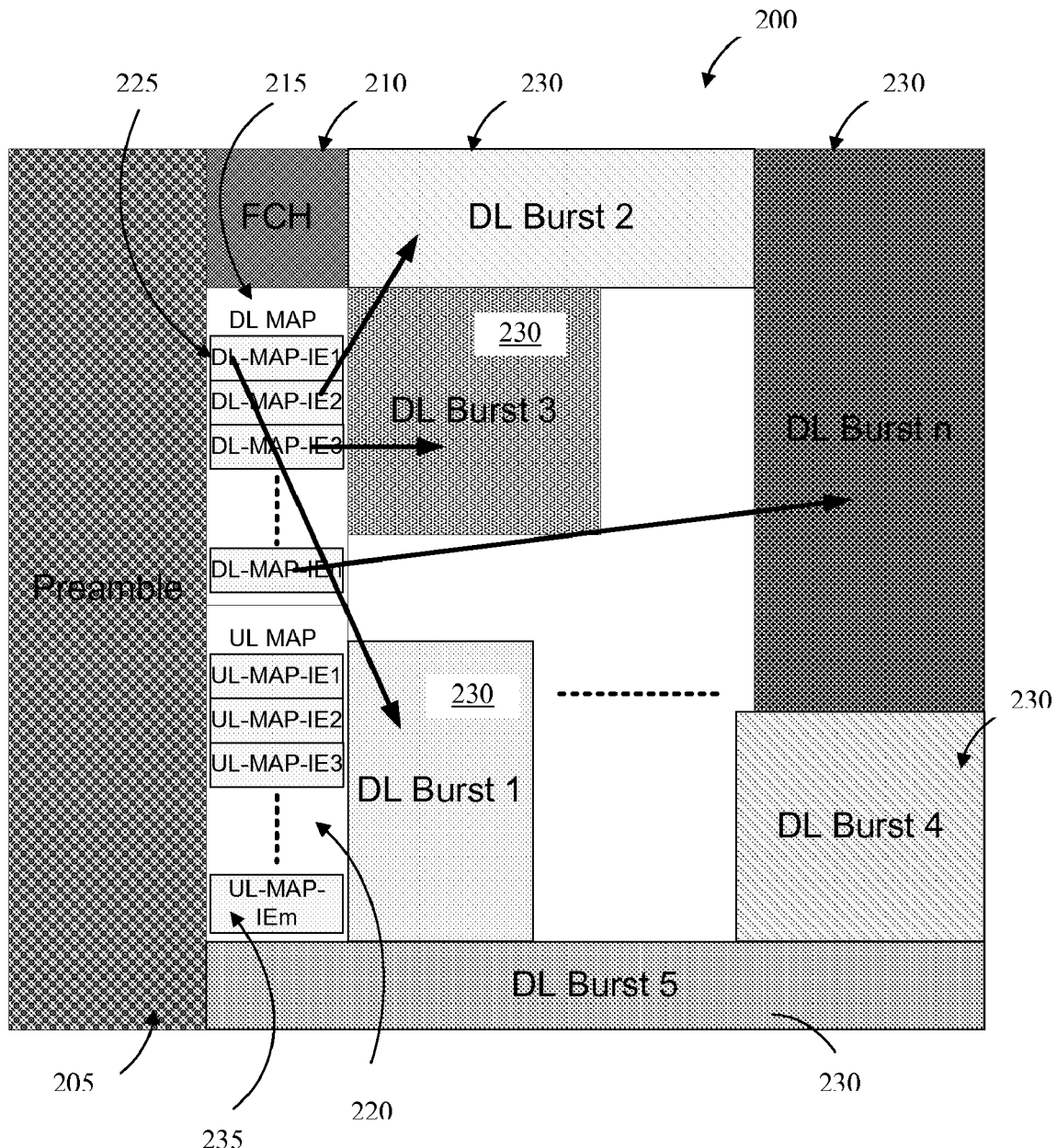
FIG. 2 is a schematic diagram illustrating the structure of an OFDMA downlink sub-frame according to the prior art.

To aid in understanding embodiments of the present invention, FIG. 2 shows the structure of an Orthogonal Frequency Division Multiple Access (OFDMA) downlink (DL) sub-frame 200 according to IEEE 802.16d/e specifications. The sub-frame 200 comprises a preamble 205 used by the subscriber stations 100 to synchronize with the base station 110. The sub-frame 200 also comprises a Frame Control Header (FCH) 210, which contains information about the current sub-frame 200, such as information about a DL-MAP 215 and an UL-MAP 220 also present in the sub-frame 200. The DL-MAP 215 contains one or more DL-MAP Information Elements 225 (DL-MAP-IE1, DL-MAP-IE2, . . . , DL-MAP-IEn) each specifying information about an associated DL burst 230 (DL Burst 1, DL Burst 2, . . . , DL Burst n) present in the DL sub-frame 200. Such information includes the location of the burst 230, modulation and coding used in the burst, etc. The UL-MAP 220 contains one or more UL-MAP IEs 235 (UL-MAP-IE1, UL-MAP-IE2, . . . , DL-MAP-IEm) each specifying information about an associated UL burst in an UL sub-frame in which the subscriber stations 100 send information to the BS 110.

FIG. 2 shows that each DL burst 230 has a rectangular shape. Embodiments of the invention are, however, not limited to any particular shape of the DL bursts 230. Moreover, although FIG. 2 shows the DL part of the sub-frame 200 that employs an OFDMA-based physical layer, embodiments of the invention are also applicable to the DL part of a frame that employs other types of physical layer, such as single carrier (SC) physical layer or Orthogonal Frequency Division Multiplexing (OFDM) physical layer.

Embodiments of the present invention are directed to a method and apparatus for encoding an identification of the subscriber stations 100 and their connections in a data frame, such as a sub-frame 200, for transmission in wireless communication networks 120 comprising at least one base station 110 and at least one subscriber station 100. The method includes specifying a subscriber station identification in the data frame to identify the one or more subscriber stations 100 for which contents of the data frame are destined and specifying a connection identification in the data frame to identify the connections of the one or more identified subscriber stations 100 to which the contents of the data frame belong.

To determine which subscriber stations 100 are to receive the contents of the data frame, such as Media Access Control Protocol Data Units (MAC PDUs), one or more subscriber station identifications (IDs) are specified. In one possible scenario, the number of subscriber station IDs depends on the maximum possible number of subscriber stations in a domain M of the communication network 120 within which the subscriber station IDs must be unique. The number of subscriber station IDs also depends on the number of broadcast connections and multicast connections. One subscriber station ID is required to identify each multicast connection and each broadcast connection. In other scenarios, the number of subscriber station IDs may have a different value and embodiments of the present invention are not limited to the number of subscriber station IDs.

According to some embodiments, the domain M can be defined as, for example, a coverage region of a BS, more than one BS or a subnet. It will be appreciated, however, that the present invention is also applicable to domains defined in another manner. To illustrate embodiments of the invention, the coverage region of one BS is considered as the domain. In this example, if the maximum possible number of subscriber stations in the coverage region of one BS is M, the number of bits required to encode the subscriber identification=greatest integer [log 2(M+M1+M2)], in which M1 and M2 are the number of multicast and broadcast connections, respectively.

Once the one or more identities of the subscriber stations 100 receiving the MAC PDUs are specified, the one or more connections to which the MAC PDUs belong must be determined. The connections are determined by specifying a connection identification (ID) and the number of connection IDs depends on the maximum possible number of connections per subscriber station, N. Therefore, the number of bits required to encode the connection ID=greatest integer [$\log_2(N)$].

Embodiments of the invention include specifying the subscriber station identification and the connection identification of the MAC PDUs in a single stage or in two stages. Encoding in a single stage is referred to herein as joint-ID-encoding (JIE) and encoding in two stages is referred to herein as separate-ID-encoding (SIE). Encoding in a single stage specifies an ID that uniquely identifies a particular connection of a particular subscriber station. The number of bits B1 required for each joint ID is given by Equation (1):

$$B1 = \text{greatest integer } [\log_2(M+M1+M2)N] \quad \text{Eqn. (1)}$$

When encoding separately, once the subscriber station 100 is known from the subscriber station ID, the connection ID uniquely identifies a particular connection of the subscriber station. Thus, a particular connection of a particular subscriber station 100 can be uniquely identified using both the subscriber station ID and the connection ID. When encoding separately, the number of bits B2, B3, required for the subscriber station ID and the connection ID respectively, are given by Equations (2) and (3):

$$B2 = \text{greatest integer } [\log_2(M+M1+M2)] \quad \text{Eqn. (2)}$$

$$B3 = \text{greatest integer } [\log_2(N)] \quad \text{Eqn. (3)}$$

JIE is more suitable when it is desired to uniquely identify a particular connection of a particular subscriber station. Thus, JIE is suitable when the one or more receivers of MAC PDUs are specified in one stage, i.e., the identification of the MAC PDUs is specified at one place. One example of this is the scenario in which the INC_CID=0 in the IEEE 802.16d/e standards described above. When INC_CID=0, because the DL-MAP-IE does not contain the CID information, the identification of the subscriber stations 100 receiving the MAC PDUs in the corresponding DL burst 230 is contained solely in a header of the MAC PDU. It may be noted that JIE of the present invention can be replaced by the CID value known from IEEE 802.16d/e standards.

According to some embodiments, SIE is more suitable when the identification of the MAC PDUs is implemented using two stages, for example, when the subscriber station ID and the connection ID are specified in separate places. The one or more subscriber station IDs can be specified at one place to identify the one or more subscriber stations 100 of the MAC PDUs, after which the one or more connection IDs can be used to specify the one or more connections to which the MAC PDUs belong. For example, SIE can be more suitable for the ULMAP-IE scenario of IEEE 802.16d/e standards described above. In the UL-MAP-IEs 235, the BS 110 specifies the allocations for different subscriber stations 100, which the subscriber stations use to send their MAC PDUs to the BS 110 in the UL. Based on the location of a particular MAC PDU in the UL channel, the BS 110 can determine the identity of the subscriber station sending the MAC PDUs. Hence, embodiments of the present invention comprise specifying the subscriber station identification by a location of a data unit in an uplink channel from which the subscriber station is identified. In another example, SIE is suitable for the scenario in which the INC_CID=1 in the IEEE 802.16d/e standards described above. When INC_CID=1, the DL-MAP-IE could contain only the subscriber station ID to specify the subscriber station(s) 100 for which MAC PDUs are present in a DL burst 230. Then, the identification of a particular connection of the subscriber station(s) 100 to which the information belongs is specified in the header of the MAC PDU. Hence, it will be appreciated that SIE can be used in both DL and UL communications.

Once the BS 110 determines the identity of the subscriber station sending the MAC PDUs, it only needs to learn the connection to which the MAC PDU belongs. This can be achieved by specifying just the connection ID in the header of the MAC PDU instead of specifying the CID parameter in both UL-MAP-IEs 235 as well as MAC PDU headers as in IEEE 802.16d/e standards. The use of SIE of embodiments of the present invention thus reduces the overhead associated with the identification of MAC PDUs in the communication network 120.

Embodiments of the present invention will now be described in further detail by way of example when implemented in IEEE 802.16d/e standards. It will be appreciated, however, that the applicability of the present invention is not limited to IEEE 802.16d/e standards and is applicable to other IEEE standards, such as 802.20, as well as other non-IEEE communication standards, such as Third Generation Partnership Project Long-Term Evolution (3GPP LTE) and 3GPP Phase 2 Air Interface Evolution (3GPP2 AIE).

Table 1 shows the format of a DL-MAP-IE 225 of the DL-MAP 215 of the data frame 200 according to embodiments of the present invention:

TABLE 1

| Syntax | Size | Notes |
| --- | --- | --- |
| DL_MAP_IE ( ) { | | |
| DIUC | 4 bits | |
| If (DIUC == 14) { | | |
| Extended-2 DIUC dependent IE | | |
| } Else if (DIUC == 15) { | | |
| Extended DIUC dependent IE | Variable | |
| } else { | | |
| If (INC_SS_ID = = 1) { | | DL-MAP starts with INC_SS_ID = 0. INC_SS_ID is toggled between 0 and 1 by the SS_ID_SWITCH_IE ( ). It may be noted that SS_ID_SWITCH_IE ( ) need to be defined. See Table 2. |
| N_SS_ID | 8 bits | No. of SS_IDs assigned for this IE. |
| For (n=0; n <= N_SS_ID; n++) { | | |
| SS_ID | B2 bits | |
| } | | |
| OFDMA symbol offset | 8 bits | |
| . | | |
| . | | |
| . | | |
| } | | |

One possible format of SS_ID_SWITCH_IE ( ) is shown in Table 2:

TABLE 2

| Syntax | Size | Notes |
| --- | --- | --- |
| SS_ID_SWITCH_IE ( ) { | | |
| Extended DIUC | 4 bits | SS ID-Switch = 0x09. It may be noted that Extended DIUC 0x09 is not used and is reserved in the current IEEE 802.16e standard. So this value could be used to indicate outer ID-Switch-IE |
| Length | 4 bits | Length = 0x00 |
| } | | |

In the DL-MAP 215, a BS 110 may transmit a value for the Downlink Interval Usage Code (DIUC)=15 with the SS ID_SWITCH_IE ( ) toggle the inclusion of the subscriber station ID parameter in the DL-MAP allocations. The DL-MAP 215 begins in a mode in which subscriber station IDs are not included. The first appearance of SS-ID-SWITCH-IE ( ) toggles the DL-MAP mode to include subscriber station IDs. Any subsequent appearance of SS_ID_SWITCH_IE ( ) toggles the inclusion of the subscriber station ID parameter in the DL-MAP allocations.

The INC_SS_ID flag in the DL-MAP-IE 225 shown in Table 2 has possible values of 0 or 1. When INC_SS_ID=0, subscriber station IDs of the MAC PDUs in a DL burst 230 are not specified in the corresponding DL-MAP-IE 225. However, when INC_SS_ID=1, the subscriber station IDs of the MAC PDUs are specified in the corresponding DL_MAP_IE 225.

When INC_SS_ID=0 in a DL_MAP_IE 225, it is not clear to a subscriber station 100 if its MAC PDUs are present in the corresponding DL burst 230. Therefore, the subscriber station can decide to process the contents of the corresponding DL burst 230 to learn the presence or absence of its MAC PDUs in the DL burst 230. Thus, when INC_SS_ID=0, the subscriber station has to process the entire DL burst 230 even if there are no MAC PDUs for it in the burst. In this case, the header of MAC PDUs is the only place to specify the complete identification, i.e., both the subscriber station ID and the connection IDs of the MAC PDUs. Thus, JIE according to embodiments of the present invention is used to encode the identification of the MAC PDUs. One possible format for the header of MAC PDUs referred to as a Generic MAC Header (GMH) 300 in IEEE 802.16d/e standards when INC_SS_ID=0 is shown in FIG. 3.

Figure 3:
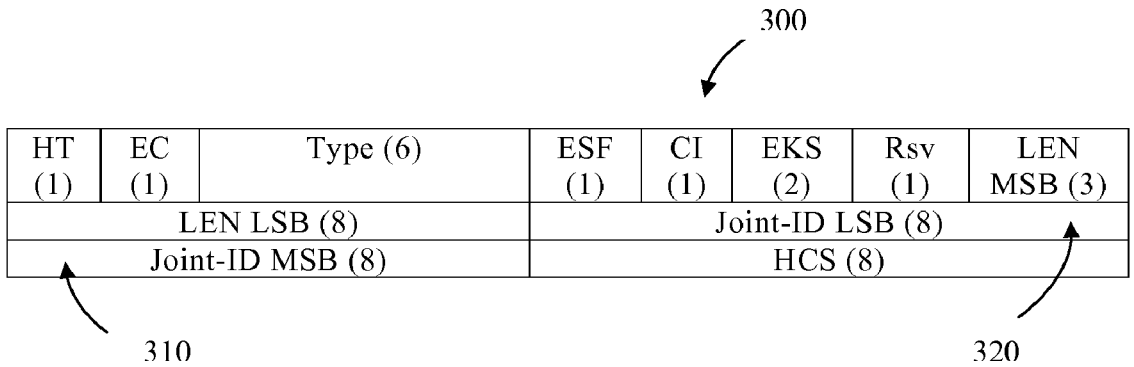
FIG. 3 is a schematic diagram illustrating the format of a header according to embodiments of the present invention.

Referring to FIG. 3, the JIE uniquely identifies a particular connection of a particular subscriber station, i.e., uniquely specifies both the subscriber station ID and the connection ID. The Joint-ID Most Significant Bit (MSB) 310 and Joint-ID Least Significant Bit (LSB) 320 could differ from the GMH of existing IEEE 802.16d/e standards and represent a possible format for the GMH when JIE embodiments of the present invention are used. The Joint-ID fields 310, 320 in FIG. 3 can alternatively contain the CID values of the connection to specify the same information as the Joint-ID.

When INC_SS_ID=1 in a DL_MAP_IE 225, a subscriber station 100 learns of the presence or absence of its MAC PDUs in the corresponding DL burst 230 from the subscriber station IDs specified in the respective DL-MAP-IE 225. If the subscriber station ID of a subscriber station is present in a DL-MAP-IE 225, the subscriber station learns that its MAC PDUs are present in the corresponding DL burst 230. Otherwise, the subscriber station learns of the absence of its MAC PDUs in the DL burst. Thus, when INC_SS_ID=1, the subscriber station only processes a DL burst 230 if the corresponding DL-MAP-IE 225 contains its subscriber station ID.

According to some embodiments, a subscriber station 100 processes a DL burst 230 when the corresponding DL-MAP-IE 225 contains at least one of the following: the subscriber station ID of the subscriber station 100; the subscriber station ID of a broadcast connection that the subscriber station 100 is interested in; and/or the subscriber station ID of a multicast group of which the subscriber station 100 is a member.

Once the subscriber station 100 learns that a particular DL burst 230 contains its MAC PDUs, the subscriber station processes the DL burst 230 and receives its MAC PDUs. The subscriber station 100 locates its MAC PDU in the DL burst 230 using a particular technique. For example, the MAC PDUs in a DL burst 230 can be arranged in the same order as their corresponding subscriber station IDs in the DL-MAP-IE 225. Thus, if a particular subscriber station ID is the ith subscriber station ID in the DL-MAP-IE 225, the corresponding MAC PDU is the ith MAC PDU in the DL burst 230. Thus, by examining the location of its subscriber station ID, or the subscriber station ID of the multicast or broadcast connections, the subscriber station 100 can locate its MAC PDU inside the DL burst 230. Hence, some embodiments of the present invention comprise specifying multiple subscriber station identifications in the data frame 200 in an order corresponding to an order of data units in an associated burst 230 or vice versa. Nonetheless, there can be other methods by which the subscriber station 100 can locate its MAC PDUs in a DL burst 230 after learning about their presence in the DL burst and the invention is not limited in this respect.

Figure 4:
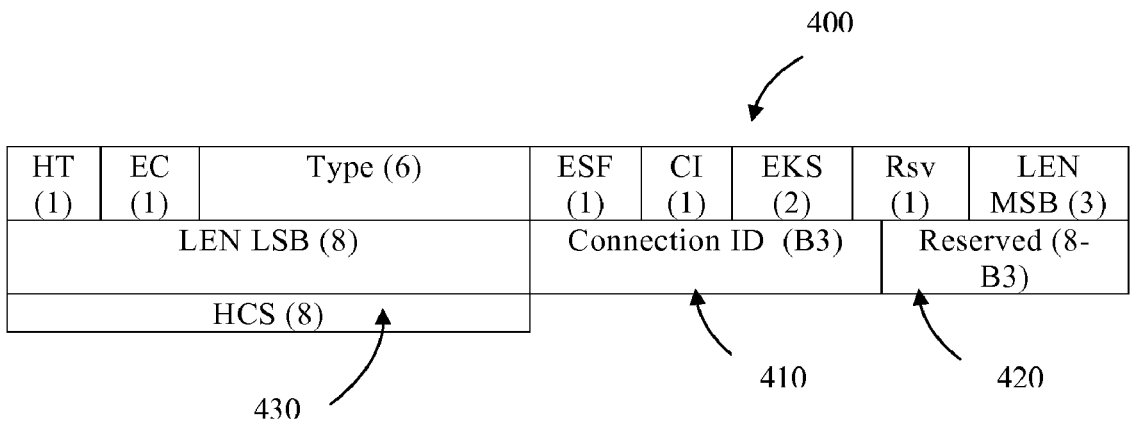
FIG. 4 is a schematic diagram illustrating the format of another header according to embodiments of the present invention.

Once the subscriber station receives a MAC PDU, the subscriber station must determine the connection to which the MAC PDUs belong. This is achieved in embodiments of the present invention by specifying the connection ID in the header of the MAC PDU. One possible format for the GMH 400 of MAC PDUs in the IEEE 802.16d/e standards when INC_SS_ID=1 is shown in FIG. 4.

As the number of bits, B3, required to specify the connection ID 410 may be less than 8 bits, the remaining bits 420 of the 4th octets can be reserved for future use. If the GHM 400 is not required to be octet aligned, a Header Check Sequence (HCS) 430 of the header can be started after the connection ID 420. In most cases, headers are octet aligned for easier processing. If B3 I8, the size of the GMH 400 when INC_SS_ID=1 is 5 bytes instead of the 6 bytes in the existing IEEE 802.16d/e standards. Therefore, embodiments of the present invention achieve a reduction of one byte in the size of the GMH 400 when INC_SS_ID=1. This reduces the overhead associated with the GMH. If B3<8 and the GMH 400 does not need to be byte aligned, the reduction in overhead is even higher because there is no need to keep the reserved bits in the header. When there is only one connection for a particular subscriber station ID, for example, in the cases of multicast and broadcast connections, there is no need to specify the connection ID in the GHM 400. In certain cases, for ease of implementation, however, if the connection ID field 420 is kept in the GHM, its value can be set to zero or ignored or can be used for other purposes. Hence, embodiments of the present invention include reducing a size of the header 400 of the MAC PDU by a number of bits not required to specify the subscriber station identification and/or the connection identification.

Similar to DL allocations, the BS 110 specifies the UL allocations for different subscriber stations 100 in the UL-MAP 220 using UL-MAP-IEs 235. The subscriber stations 100 use the UL allocations to send their MAC PDUs to the BS 110. Different types of UL allocation specifications according to different embodiments of the present invention will now be described.

Some embodiments use subscriber station-specific allocations in which the BS 110 specifies the UL allocations per subscriber station. The subscriber stations can then decide how to use the allocations for the MAC PDUs of different connections. In this case, it is sufficient for the BS 110 to indicate UL allocations using the subscriber station IDs of the subscriber stations in the UL-MAP-IEs 235. Subscriber stations learn about their UL allocations using their subscriber station IDs in the UL-MAP-IEs 235. Then, the subscriber stations use their allocations to send their MAC PDUs to the BS 110. The BS 110 stores the allocations it has made for a particular instance of the UL sub-frame, for example, the UL sub-frame of frame K. Since a frame 200 consists of one DL sub-frame and an UL sub-frame, the BS 110 already knows the subscriber station ID of MAC PDUs in the different parts of the UL sub-frame. The only other parameter the BS 110 requires to identify the connections of the MAC PDUs are the connection IDs of the MAC PDUs. Thus, it is sufficient that the header of a MAC PDU contains the connection ID of the MAC PDU. This can be implemented by using the GMH 400 format shown in FIG. 4. Hence, embodiments of the invention comprise at least one of the subscriber stations 100 specifying the connection identification, but not the subscriber station identification, in the uplink header of the MAC PDU when the BS 110 has already specified the subscriber station identification in an uplink allocation.

Some embodiments use connection-specific allocations in which the BS 110 specifies the UL allocations per connection. The BS 110 indicates the UL allocations using the joint IDs of the subscriber stations 100 in the UL-MAP-IEs 235. It may be noted that the CIDs used in IEEE 802.16d/e standards can be used instead of the joint IDs of the present invention in the UL-MAP-IEs 235. Thus, the allocation uniquely identifies the connection of a particular subscriber station for which the allocation is made. For such connection-specific UL allocations, the subscriber stations 100 can use the allocations in accordance with at least two different methods as described hereinafter.

For the connection-specific UL allocations described above, in one method the subscriber station 100 uses the UL allocation to transfer the MAC PDUs of the connection for which the allocation is made and not the MAC PDUs of any other connection. In this case, the BS 110 can uniquely identify the subscriber station ID as well the connection ID of the UL MAC PDUs in the UL sub-frame of frame K by just recalling the stored UL allocations of frame K. In this case, the header of a MAC PDU is not required to specify either the subscriber station ID or the connection ID of the MAC PDU. Hence, some embodiments of the invention comprise at least one of the subscriber stations 100 specifying neither the connection identification nor the subscriber station identification in an uplink header of the MAC PDU when the base station 110 has already specified the connection identification and the subscriber station identification in an uplink allocation.

Figure 5:
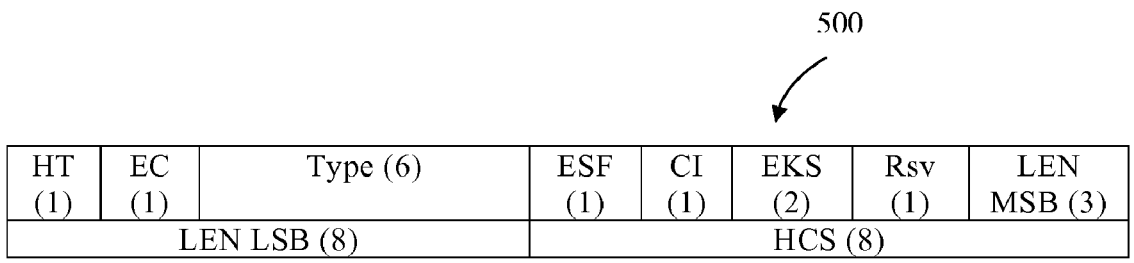
FIG. 5 is a schematic diagram illustrating the format of a further header according to embodiments of the present invention.

One possible format for the GMH 500 of MAC PDUs when such connection-specific UL allocation embodiments are implemented in IEEE 802.16d/e standards is shown in FIG. 5. The GMH 500 that can be used for embodiments of the present invention reduces the number of bytes required for the GMH by two bytes compared to the existing IEEE 802.16d/e standards.

For the connection-specific UL allocations described above, in a second method the subscriber station 100 can use the UL allocation to transfer one or more of the MAC PDUs of the connection for which the allocation is made and the MAC PDUs of any other connection. Hence, the subscriber station 100 has the liberty to use the UL allocation to send MAC PDUs of any one or more of its connections irrespective of the connections specified in a respective UL allocation when the base station 110 has already specified the connection identification and the subscriber station identification in an uplink allocation. In this case, the BS 110 identifies the subscriber station IDs of the MAC PDUs from the locations in the UL sub-frame of frame K by recalling the stored UL allocations of frame K. The BS 110 still, however, requires the connection ID of the MAC PDUs to identify the connection ID of the UL MAC PDUs in the UL sub-frame. Therefore, the header of a MAC PDU is required to specify the connection ID of the MAC PDU. One possible format for the GMH of MAC PDUs when such connection-specific UL allocation embodiments are implemented in IEEE 802.16d/e standards is the GMH 500 shown in FIG. 4.

FIG. 6 summarizes the overhead saving in the GMH 400, 500 and in the DL/UL-MAP-IEs 225, 235 when embodiments of the present invention are used instead of the procedures specified in IEEE 802.16d/e standards. The results show that significant savings are achieved in both the GMH as well in DL/UL-MAP-IEs when the proposed invention is used. JIE is more suitable when it is used for identifying a particular subscriber station 100 as well as a particular connection of the subscriber station at the same time. On the other hand, when it is desired to identify only a particular subscriber station 100, but not its connections, it is desirable to use the subscriber station ID. Once the subscriber station 100 is identified, the connection ID can be used separately to identify its connections.

Figure 7:
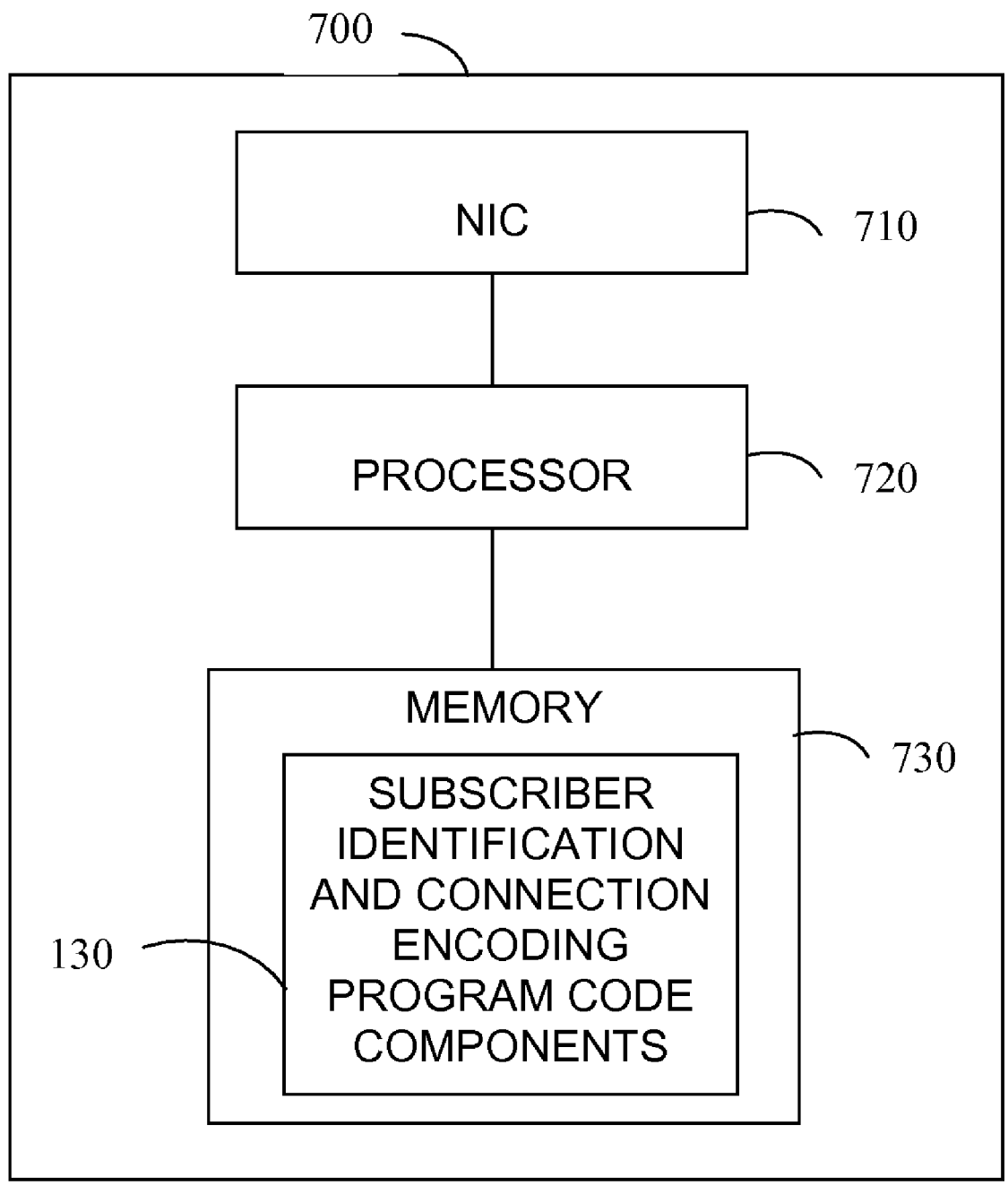
FIG. 7 is a schematic diagram illustrating components of the apparatus according to embodiments of the present invention.

Referring to FIG. 7, a schematic diagram illustrates some of the components of an apparatus 700 in the form of the subscriber stations 100 or the base station 110, according to some embodiments of the present invention. Each apparatus 700 can comprise a physical wireless Network Interface Card (NIC) 710 coupled to a processor 720, such as a standard microprocessor, ASIC, FPGA or the like for implementing embodiments of the invention as described herein. For example, processor 720 can be operatively coupled to a storage medium in the form of a memory 730. The memory 730 comprises a computer-readable medium, such as a random access memory (e.g., static random access memory (SRAM), or synchronous dynamic random access memory (SDRAM)), read only memory (e.g., programmable read only memory (PROM), or electrically erasable programmable read only memory (EEPROM)), or hybrid memory (e.g., FLASH), or other types of memory suitable for the said type of storage, as is well known in the art. The computer-readable medium comprises computer-readable program code components 130 for encoding subscriber station identifications and their connections in wireless communication networks in accordance with the teachings of the present invention, at least some of which are selectively executed by the processor 720 and are configured to cause the execution of the embodiments of the present invention described herein.

It should be appreciated that the specific combination of code components 130 stored in the subscriber stations 100 and the base stations 110 can be different. For example, at the base station 110, the code components 130 need to implement both joint-ID-encoding (JIE) as well as separate-ID-encoding (SIE) of subscriber station IDs and connection IDs. On the other hand, at the subscriber station 100 the code components 130 need to implement JIE of the subscriber station ID and connection IDs and SIE of just the connection IDs.

Advantages of the various embodiments of the present invention thus include reducing the overhead associated with specifying the DL and UL allocations and the identification of MAC PDUs in the communication networks. Embodiments of the invention include specifying a subscriber station identification and a connection identification in the data frame to respectively identify the one or more subscriber stations 100 for which contents of the data frame are destined and the one or more connections of the one or more identified subscriber stations to which the contents of the data frame belong. The subscriber station identification and the connection identification can be specified either jointly or separately and fewer air-link resources are consumed to convey the same information compared with the prior art. Reduced overhead requires reduced processing by base stations 110 and subscriber stations 100 resulting in increased efficiency and reduced power consumption.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method, comprising:
    encoding an identification of a subscriber station and its connections in a data frame for transmission in a wireless communication network comprising at least one base station and at least one subscriber station, the encoding comprising:
    specifying a subscriber station identification in the data frame to identify the one or more subscriber stations for which contents of the data frame are destined; and
    specifying a connection identification in the data frame to identify one or more connections of the one or more identified subscriber stations to which the contents of the data frame belong; and
    wherein
        specifying the subscriber station identification and the connection identification is specified in a single stage in the following number of bits: B1=greatest integer [log 2(M+M1+M2)N],
        specifying the subscriber station identification and the connection identification is specified in two stages requiring the following number of bits for the subscriber station identification: B2=greatest integer [log 2(M+M1+M2)], or
        specifying the subscriber station identification and the connection identification is specified in two stages requiring the following number of bits for the connection identification: B3=greatest integer [log 2(N)],
        in which M is the maximum possible number of subscriber stations in a coverage region of the at least one base station, M1 is the number of multicast connections, M2 is the number of broadcast connections and N is the maximum possible number of connections per subscriber station.

2. The method of claim 1, further comprising specifying multiple subscriber station identifications in the data frame in an order corresponding to an order of data units in an associated burst.

3. The method of claim 1, further comprising specifying the subscriber station identification by a location of a data unit in an uplink channel from which the subscriber station is identified.

4. The method of claim 1, further comprising specifying the subscriber station identification and/or the connection identification in an uplink map information element and/or in a downlink map information element.

5. The method of claim 1, further comprising specifying the subscriber station identification and/or the connection identification in a header of a media access control protocol data unit.

6. The method of claim 1, further comprising reducing a size of a header of a media access control protocol data unit by a number of bits not required to specify the subscriber station identification and/or the connection identification.

7. The method of claim 1, further comprising the at least one subscriber station specifying the connection identification, but not the subscriber station identification, in an uplink header of a media access control protocol data unit when the base station has already specified the subscriber station identification in an uplink allocation.

8. The method of claim 1, further comprising the at least one subscriber station specifying neither the connection identification nor the subscriber station identification in an uplink header of a media access control protocol data unit when the base station has already specified the connection identification and the subscriber station identification in an uplink allocation.

9. The method of claim 1, further comprising the subscriber station sending data units of any of its connections irrespective of the connection specified in a respective uplink allocation when the base station has already specified the connection identification and the subscriber station identification in the uplink allocation.

10. An apparatus for encoding an identification of a subscriber station and connections of the subscriber station in a data frame for transmission in a wireless communication network comprising at least one base station and at least one subscriber station, said apparatus comprising:
    at least one non-transitory computer-readable medium comprising:
        computer-readable program code components configured to cause specifying a subscriber station identification in the data frame to identify the one or more subscriber stations for which contents of the data frame are destined; and
        computer-readable program code components configured to cause specifying a connection identification in the data frame to identify one or more connections of the one or more identified subscriber stations to which the contents of the data frame belong; and
        wherein
            the computer-readable program code components is configured to cause specifying the subscriber station identification and the connection identification in a single stage in the following number of bits: B1=greatest integer [log 2(M+M1+M2)N],
            computer-readable program code components is configured to cause specifying the subscriber station identification and the connection identification in two stages requiring the following number of bits to specify the subscriber station identification: B2=greatest integer [log 2(M+M1+M2)] or computer-readable program code components is configured to cause specifying the subscriber station identification and the connection identification in two stages requiring the following number of bits to specify the connection identification: B3=greatest integer [log 2(N)], in which M is the maximum possible number of subscriber stations in a coverage region of the at least one base station, M1 is the number of multicast connections, M2 is the number of broadcast connections and N is the maximum possible number of connections per subscriber station.

11. The apparatus of claim 10, further comprising computer readable program code components configured to cause specifying multiple subscriber station identifications in an order corresponding to an order of data units in an associated burst.

12. The apparatus of claim 10, further comprising computer readable program code components configured to cause specifying the subscriber station identification by a location of a data unit in an uplink channel from which the subscriber station is identified.

13. The apparatus of claim 10, further comprising computer readable program code components configured to cause specifying the subscriber station identification and/or the connection identification in an uplink map information element and/or the downlink map information element.

14. The apparatus of claim 10, further comprising computer readable program code components configured to cause specifying the subscriber station identification and/or the connection identification in a header of a media access control protocol data unit.

15. The apparatus of claim 10, further comprising computer readable program code components configured to cause reducing a size of a header of a media access control protocol data unit by a number of bits not required to specify the subscriber station identification and/or the connection identification.

16. The apparatus of claim 10, further comprising computer readable program code components configured to cause the at least one subscriber station specifying neither the connection identification nor the subscriber station identification in an uplink header of a media access control protocol data unit when the base station has already specified the connection identification and the subscriber station identification in an uplink allocation.

17. The apparatus of claim 10, further comprising computer readable program code components configured to cause the at least one subscriber station specifying neither the connection identification nor the subscriber station identification in an uplink header of a media access control protocol data unit when the base station has already specified the connection identification and the subscriber station identification in an uplink allocation.

18. The apparatus of claim 10, further comprising computer readable program code components configured to cause the subscriber station sending data units of any of its connections irrespective of the connection specified in a respective uplink allocation when the base station has already specified the connection identification and the subscriber station identification in the uplink allocation.

19. A processor for encoding an identification of a subscriber station and its connections in a data frame for transmission in a wireless communication network comprising at least one base station and at least one subscriber station by specifying a subscriber station identification in the data frame to identify the one or more subscriber stations for which contents of the data frame are destined, by specifying a connection identification in the data frame to identify one or more connections of the one or more identified subscriber stations to which the contents of the data frame belong;

wherein:

specifying the subscriber station identification and the connection identification is specified in a single stage in the following number of bits: B1=greatest integer [log 2(M+M1+M2)N], specifying the subscriber station identification and the connection identification is specified in two stages requiring the following number of bits for the subscriber station identification: B2=greatest integer [log 2(M+M1+M2)], or specifying the subscriber station identification and the connection identification is specified in two stages requiring the following number of bits for the connection identification: B3=greatest integer [log 2(N)], in which M is the maximum possible number of subscriber stations in a coverage region of the at least one base station, M1 is the number of multicast connections, M2 is the number of broadcast connections and N is the maximum possible number of connections per subscriber station.

20. A method, comprising:

encoding an identification of a subscriber station and its connections in a data frame for transmission in a wireless communication network comprising at least one base station and at least one subscriber station, the encoding comprising:

specifying a subscriber station identification in the data frame to identify the one or more subscriber stations for which contents of the data frame are destined;

specifying a connection identification in the data frame to identify one or more connections of the one or more identified subscriber stations to which the contents of the data frame belong; and one of:

specifying at the at least one subscriber station the connection identification, but not the subscriber station identification, in an uplink header of a media access control protocol data unit when the base station has already specified the subscriber station identification in an uplink allocation, specifying at the at least one subscriber station neither the connection identification nor the subscriber station identification in an uplink header of a media access control protocol data unit when the base station has already specified the connection identification and the subscriber station identification in an uplink allocation, or sending by the subscriber station data units of any of its connections irrespective of the connection specified in a respective uplink allocation when the base station has already specified the connection identification and the subscriber station identification in an uplink allocation.

21. An apparatus for encoding an identification of a subscriber station and connections of the subscriber station in a data frame for transmission in a wireless communication network comprising at least one base station and at least one subscriber station, said apparatus comprising:

at least one non-transitory computer-readable medium comprising:

computer-readable program code components configured to cause specifying a subscriber station identification in the data frame to identify the one or more subscriber stations for which contents of the data frame are destined;

computer-readable program code components configured to cause specifying a connection identification in the data frame to identify one or more connections of the one or more identified subscriber stations to which the contents of the data frame belong; and one of:

computer-readable program code components configured to cause the at least one subscriber station to specify the connection identification, but not the subscriber station identification, in an uplink header of a media access control protocol data unit when the base station has already specified the subscriber station identification in an uplink allocation, computer-readable program code components configured to cause the at least one subscriber station to specify neither the connection identification nor the subscriber station identification in an uplink header of a media access control protocol data unit when the base station has already specified the connection identification and the subscriber station identification in an uplink allocation, or computer-readable program code components configured to cause the at least one subscriber station to sending data units of any of its connections irrespective of the connection specified in a respective uplink allocation when the base station has already specified the connection identification and the subscriber station identification in an uplink allocation.

* * * * *